(12) United States Patent
Chandler

(10) Patent No.: US 7,233,935 B1
(45) Date of Patent: Jun. 19, 2007

(54) POLICY-BASED AUTOMATION USING MULTIPLE INFERENCE TECHNIQUES

(75) Inventor: Christopher James Elphinstone Chandler, Boston, MA (US)

(73) Assignee: Veritas Operating Corporation, Mountain View, CA (US)

( * ) Notice: Subject to any disclaimer, the term of this patent is extended or adjusted under 35 U.S.C. 154(b) by 310 days.

(21) Appl. No.: 10/825,700

(22) Filed: Apr. 16, 2004

(51) Int. Cl.
- *G06F 17/00* (2006.01)
- *G06F 15/18* (2006.01)
- *G06N 5/02* (2006.01)
- *G05B 13/02* (2006.01)
- *G06E 1/00* (2006.01)
- *G06E 3/00* (2006.01)
- *G06G 7/00* (2006.01)

(52) U.S. Cl. .............................. 706/47; 706/4; 706/23

(58) Field of Classification Search .................... 706/1, 706/15, 45, 2, 3, 4, 8, 19, 934, 23, 47; 700/1, 700/90; 709/219, 224, 229; 705/1, 7, 2, 705/10

See application file for complete search history.

(56) References Cited

U.S. PATENT DOCUMENTS

2003/0051026 A1* 3/2003 Carter et al. ................. 709/224
2003/0172133 A1* 9/2003 Smith et al. ................. 709/219

OTHER PUBLICATIONS

'A deductive probabilistic and fuzzy object oriented database language': T. H. Cau, J. M. Rossiter, 2003, Elsevier, Fuzzy Sets and Systems 140 (2003) 129-150.*

'Inequalities in Fuzzy Probability Calculus': Janssens, BeBaets, DeMeyer, 2003, Springer-Verlag, IFSA 2003 LNAI 2715, pp. 211-218.*

"The Programming Language Fril," Dept. of Engineering Mathematics, http: http://www.fen.bris.ac.uk/engmaths/research/aigroup/fril.html, Mar. 16, 1997, (3 pages).

"Trustworthy_policy_based_automation_of_storage_management," Veritas Software, Jun. 25, 2003, (1 page).

"FRIL—the Fuzzy Relational Inference Language," Artificial Intelligence @ Bristol, Jun. 17, 2002 (1 Page).

(Continued)

*Primary Examiner*—Joseph P Hirl
*Assistant Examiner*—Peter Coughlan
(74) *Attorney, Agent, or Firm*—Robert C. Kowert; Meyertons, Hood, Kivlin, Kowert & Goetzel, P.c.

(57) ABSTRACT

System and method for policy-based decision-making using a combination of two or more inference approaches or techniques. Embodiments may provide a policy evaluation mechanism that evaluates policies using two or more inference techniques, including inference techniques that support "fuzzy" concepts, to generate a "yes/no" answer and a confidence level in the answer. In some embodiments, the policy evaluation mechanism may be a component of a decision engine that provides policy-based automation in a system or network environment. In one embodiment, a hierarchy of decision engines may be implemented that may include a central decision engine to administer system-wide policies and one or more local decision engines to administer component-level policies. Some embodiment may use a decision support language, such as FRIL (Fuzzy Relational Inference Language) or FRIL++, to express policy rules and to resolve uncertainty in policy rules using multiple AI inference techniques.

32 Claims, 7 Drawing Sheets

OTHER PUBLICATIONS

"Frill++ Uncertainty in Object Oriented Knowledge Representation and Programming," http://eis.bris.ac.uk/~enjmr/research.html, 2001, (4 Pages).

"Computer Associates Ships Neugents," http://www.netvalley.com/archives/97companynews/ca.html, 1998, (3 Pages).

* cited by examiner

POLICY-BASED AUTOMATION USING MULTIPLE INFERENCE TECHNIQUES

BACKGROUND OF THE INVENTION

1. Field of the Invention

This invention is related to the field of computer systems and, more particularly, to decision making and policy-based automation in computer systems.

2. Description of the Related Art

The Information Technology (IT) world is becoming increasingly complex, but IT managers are being pressured to drive down costs, especially by reduced staffing. IT managers would like to manage this in terms of supply, demand, and cost, rather than bytes and servers.

One of the biggest costs in an IT organization is the staffs salary cost. Other costs related to staff include the cost of errors, malicious behavior, training and education, etc. Taking the person out of the feedback loop for system administration as much as possible has been a dream for IT for a long time. Consequently, more decisions about how a system should proceed need to be made without human intervention, and more decisions need to be made at a higher level, further away from the basic bytes and devices. This implies a need for automated decision-making that responds to policy rules that are increasingly complex and less discretely defined. In other words, more "intelligence" is needed in the computer so that the human doesn't have to resolve as many problems.

Conventional expert systems and other Artificial Intelligence (AI) solutions try to make decisions by querying a knowledgebase of information to ask the question, "Is [something] known," and examining the "yes/no" Boolean result. However, these systems have not addressed the problem of applying a Boolean result to an incomplete knowledge of the system's environment. This incomplete knowledge in a conventional AI system leads to users' lack of confidence in the quality of the answers produced by such expert systems. These systems cannot be certain to evaluate the correct answer because their knowledge base must always be a subset of the sum total of knowledge, and it is not possible to be certain whether critical information was missing in an arbitrarily complex environment. Therefore, by definition, querying the system whether something is "known" cannot lead to a certain result. In practice, conventional expert systems are generally considered useless for most real world decisions because they cannot reliably choose the right answer from their knowledge of their environments.

One problem with conventional, non-trivial decision systems is that decisions may become very complicated. One reason for this is that the decisions are based on information that is not completely known or is uncertain. In addition, not everything relevant about the system for which decisions are being made is typically known. Another common reason is that two or more component rules of the policy may be in direct conflict with each other. In general, policies for more complex systems become non-linearly more complex and are much harder to program to obtain the right answer: i.e. no incorrect-positives, or incorrect-negatives. This leads to distrust of the automated system Conventional decision systems may implement Artificial Intelligence (AI) inference techniques. For example, typical conventional decision systems may use one of probability calculus, fuzzy set theory, or case based reasoning, also known as evidential logic calculus and typically implemented in neural networks to calculate a confidence level in the Boolean result. Conventional decision systems typically implement only one of these inference techniques and are targeted at particular applications for which the implemented inference technique works fairly well, and thus conventional decision systems tend to be limited to particular environments and particular problems and are therefore not generally applicable to a wide scope of applications or problems.

Further, each of the various inference techniques has limitations, and thus decision systems implementing one of these inference techniques may have limitations due to the limitation of the particular inference technique used. Fuzzy logic and probability calculus based inference techniques do not use historical information to improve the calculation of uncertainty. Probability calculus deals in probabilities, unlike the possibilities of fuzzy logic, and these probabilities require accurately seeded probability information for the underlying axioms and rules, but this information may not be measurable or otherwise known. Fuzzy logic systems require some kind of function to determine fuzzy set membership when the fuzzy set is defined, but this membership function may not be known. Case-based reasoning requires historical information to set the weights between possible choices. For example, in a decision system using a neural network, the decision system has to be taught what the right and wrong answers are before it is useful. Collection of historical information and programming of the network is necessary to help the system understand and make decisions. For example, when a server fails, a cluster server may protect applications by failing the application over to another server so that the application can continue running. If a neural network is used in an automated decision system for the cluster server, the cluster would have to be crashed repeatedly to teach the neural network that that is something it should not do.

Fuzzy Relational Inference Language (FRIL) and FRIL++

FRIL is an uncertainty logic programming language which includes Prolog as a subset of the language, and which allows probabilistic uncertainties and fuzzy sets to be included. This generalization of logic programming provides a powerful and flexible environment for modeling and implementing Artificial Intelligence applications, and extends the semantics of Prolog by embodying open worlds and true logic negation. A different list-based syntax is used from the standard "Edinburgh" syntax of Prolog. FRIL has recently been extended to represent and reason with uncertain logical class hierarchies leading to the new programming language FRIL++.

FRIL and FRIL++ can deal with uncertainty in data, facts, and rules using fuzzy sets and support pairs. In addition to the Prolog rule, there are three different types of uncertainty rules: the basic rule, the extended rule, and the evidential logic rule. The extended rule is important for causal net type applications, and the evidential logic rule is relevant to case-based and analogical reasoning. Each rule can have associated conditional support pairs, and the method of inference from such rules is based on Jeffrey's rule that is related to the theorem of total probability. Fuzzy sets can be used to represent semantic terms in FRIL clauses, and support for FRIL goals can be obtained by a process of partial matching of such fuzzy terms called semantic unification. FRIL implements a calculus of support logic programming, which defines the method of computing support pair inferences. FRIL rules can also implement Fuzzy Control knowledge simply and directly.

SUMMARY

Embodiments of a system and method for policy-based decision-making using a combination of two or more inference approaches or techniques to overcome the limitations of each individual inference technique are described. Embodiments may provide a policy evaluation mechanism that resolves decisions by evaluating policy rules using a combination of two or more inference techniques. Using multiple inference techniques, including inference techniques that support "fuzzy" concepts, embodiments of the policy evaluation mechanism support the implementation and evaluation of simpler, less fuzzy policies as well as more complex and fuzzy policies.

In embodiments, two or more inference techniques for calculating uncertainty, including, but not limited to, probability calculus, fuzzy logic and evidential logic, may be used by the policy evaluation mechanism in combination (serially and/or in parallel) to provide a measure of confidence, hereinafter referred to as a confidence level, in the "yes/no" answer generated during evaluation of policy rules, and to overcome the individual limitations of each inference technique. The confidence level may be used, for example, to help the user of the policy evaluation mechanism to gain trust in the policy evaluation mechanism's "yes/no" answers. In one embodiment, the confidence level may be determined and expressed as a range with a lower and upper bound.

In some embodiments, the policy evaluation mechanism may be a component of a policy-based automation mechanism, or decision engine, that provides policy-based automation in a system or network environment by receiving or accessing policies and information relevant to the policies as input, evaluating the policies according to the information using the policy evaluation mechanism, generating an answer and a confidence level in the answer from the policy evaluation, and providing the output of the policy evaluation (the answer and the confidence level) to a user of the system and/or automatically initiating one or more processes or actions indicated by the policy if the answer and the confidence level indicate that the processes or actions can be automatically initiated.

In one embodiment, policies may be implemented that join together different systems, components of systems, or components in a network environment, and their associated decision engines into a hierarchy of decision engines. In this embodiment, a central decision engine may be implemented to administer broad, system- or network-wide policies. The central decision engine makes high-level decisions, and delegate lower-level decisions to other local decision engines for individual components of the system or network. The central decision engine may provide decision information to the local decision engines and vice versa.

One embodiment may use a general-purpose decision support language, such as FRIL (Fuzzy Relational Inference Language) or FRIL++, to express policy rules and to resolve uncertainty in policy rules using multiple AI inference techniques. One embodiment may use a general-purpose decision support language such as FRIL or FRIL++ as a means to express policy rules that use evidential logic inference built into the decision support language by collecting historical information to tune existing policy rules for policy-based automation.

BRIEF DESCRIPTION OF THE DRAWINGS

The following detailed description makes reference to the accompanying drawings, which are now briefly described.

Figure 1:
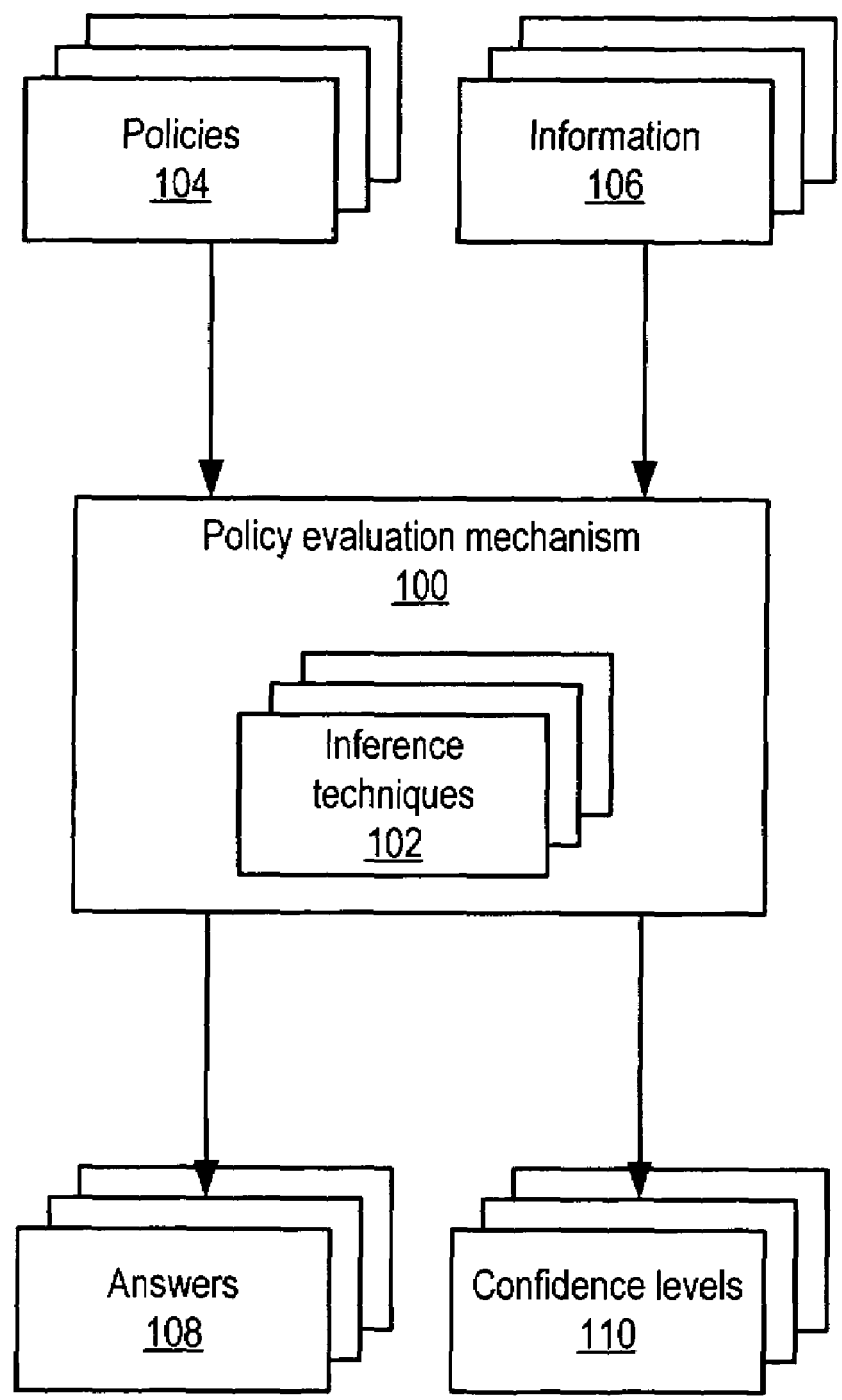
FIG. 1 illustrates a policy evaluation mechanism implementing two or more inference techniques to evaluate policies for a system according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for policy-based decision-making using a combination of two or more inference approaches or techniques to overcome the limitations of each individual inference technique are described. Embodiments may provide a policy evaluation mechanism that resolves decisions by evaluating policy rules using a combination of two or more inference techniques. Embodiments of the policy evaluation mechanism may enable the evaluation of complex policy rules. In one embodiment, policies may be expressed as one or more predicates that may be either axioms (knowledge) or conditions.

In embodiments, two or more inference techniques for calculating uncertainty, including, but not limited to, probability calculus, fuzzy logic and evidential logic, may be used by the policy evaluation mechanism in combination (serially and/or in parallel) to provide a measure of confidence, hereinafter referred to as a confidence level, in the "yes/no" answer generated during evaluation of policy rules, and to overcome the individual limitations of each inference technique. The confidence level may be used, for example, to help the user of the policy evaluation mechanism to gain trust in the policy evaluation mechanism's "yes/no" answers.

Note that the policy evaluation mechanism may also use standard Boolean algebra or logic in addition to inference techniques in making policy evaluations. These inference techniques may work in conjunction with the standard logic inference to calculate the confidence level of a "yes/no" answer. In one embodiment, the confidence level may be determined and expressed as a range with a lower and upper bound. For example, a "yes" answer may be provided along with a confidence level expressed as minimum probability of 80% (or 0.8) and a maximum probability of 85% (or 0.85).

Embodiments of the policy evaluation mechanism may be used in any application for the evaluation of policies and for automated computer system administration in the IT environment. Embodiments may be used in policy-based management and automation of storage and application management environments, and in general may be applicable to any real-world computer application. Embodiments may be used, for example, in an email system to sort mail into in-boxes or in other automatic information content recognition systems, for the automation of storage management processes, and for the automation of application management processes in the context of utility computing.

Using multiple inference techniques, including inference techniques that support "fuzzy" concepts, embodiments of the policy evaluation mechanism support the implementation and evaluation of simpler, less fuzzy policies as well as more complex and fuzzy policies. As an exemplary policy, in a storage management environment, an administrator may define a policy to implement a process such as "Run a backup every Wednesday using any one of a designated set of tape drives. Choose a tape drive and choose a file system out of a pool to be backed up and then initiate the backup." This exemplary policy is relatively simple and easy to implement. As a more complicated and "fuzzy" exemplary policy, in a storage management environment, an administrator may define a policy to implement a process such as "Back up the system as quickly as possible, using any one of these mechanisms (tape drives), but do not let the backup interfere with a database application beyond some threshold level of load, and do not interfere with this accounting application running at a particular time if the load goes above a given threshold". The second policy is more complicated, and the criteria are different and "fuzzy"—instead of "faster than 10 megabytes per second", the criteria may be expressed in "fuzzy" terms such as "quick" or "slow", etc. As an example, the definition of "quick" depends on the context in which it is being used.

In some embodiments, the policy evaluation mechanism may be a component of a policy-based automation mechanism, which may be referred to simply as a decision engine, that provides policy-based automation in a system or network environment by receiving or accessing policies and information relevant to the policies as input, evaluating the policies according to the information using the policy evaluation mechanism, generating an answer and a confidence level in the answer from the policy evaluation, and providing the output of the policy evaluation (the answer and the confidence level) to a user of the system and/or automatically initiating one or more processes or actions indicated by the policy if the answer and the confidence level indicate that the processes or actions can be automatically initiated.

Embodiments of the policy evaluation mechanism may be implemented as an enhancement to existing decision engines. Using the policy evaluation mechanism, decision engines may support more complicated rules with more diverse and "fuzzy" information to make more powerful decisions. In one embodiment, policies may be implemented that join together different systems, components of systems, or components in a network environment, and their associated decision engines into a hierarchy of decision engines. In this embodiment, a central decision engine may be implemented to administer broad, system- or network-wide policies. The central decision engine makes high-level decisions, and delegate lower-level decisions to other local decision engines for individual components of the system or network. The central decision engine may provide decision information to the local decision engines and vice versa. After implementation of the hierarchy of decision engines and the buildup of user trust in the decisions made by the hierarchy of decision engines implementing the policy evaluation mechanism, the everyday administration of the system or network environment may be almost or even completely automated by the hierarchy of decision engines. In one embodiment, trust may be gained by initially allowing a user fine-grained control of the policy evaluation mechanism's behavior. For example, the user may see the possible intermediate steps when they are proposed, and the rationale for the proposals' confidence levels. The user may then accept or override the default choice, and choose a "don't show me this again" option if desired. Typically, the user will choose the "don't show me this again" option once it has been determined that the automated system can be trusted.

One embodiment may use a general-purpose decision support language, such as FRIL (Fuzzy Relational Inference Language) or FRIL++, to express policy rules and to resolve uncertainty in policy rules using multiple AI inference techniques for policy-based automation. One embodiment may use a general-purpose decision support language such as FRIL or FRIL++ as a means to express policy rules that use evidential logic inference built into the decision support language by collecting historical information to tune existing policy rules for policy-based automation. The historical information may include one or more of, but is not limited to, historical user input about past decisions and measurements of the system's past state(s). In one embodiment, policies may be expressed as one or more predicates that may be either axioms (knowledge) or conditions in the decision support language (e.g., FRIL).

Figure 2:
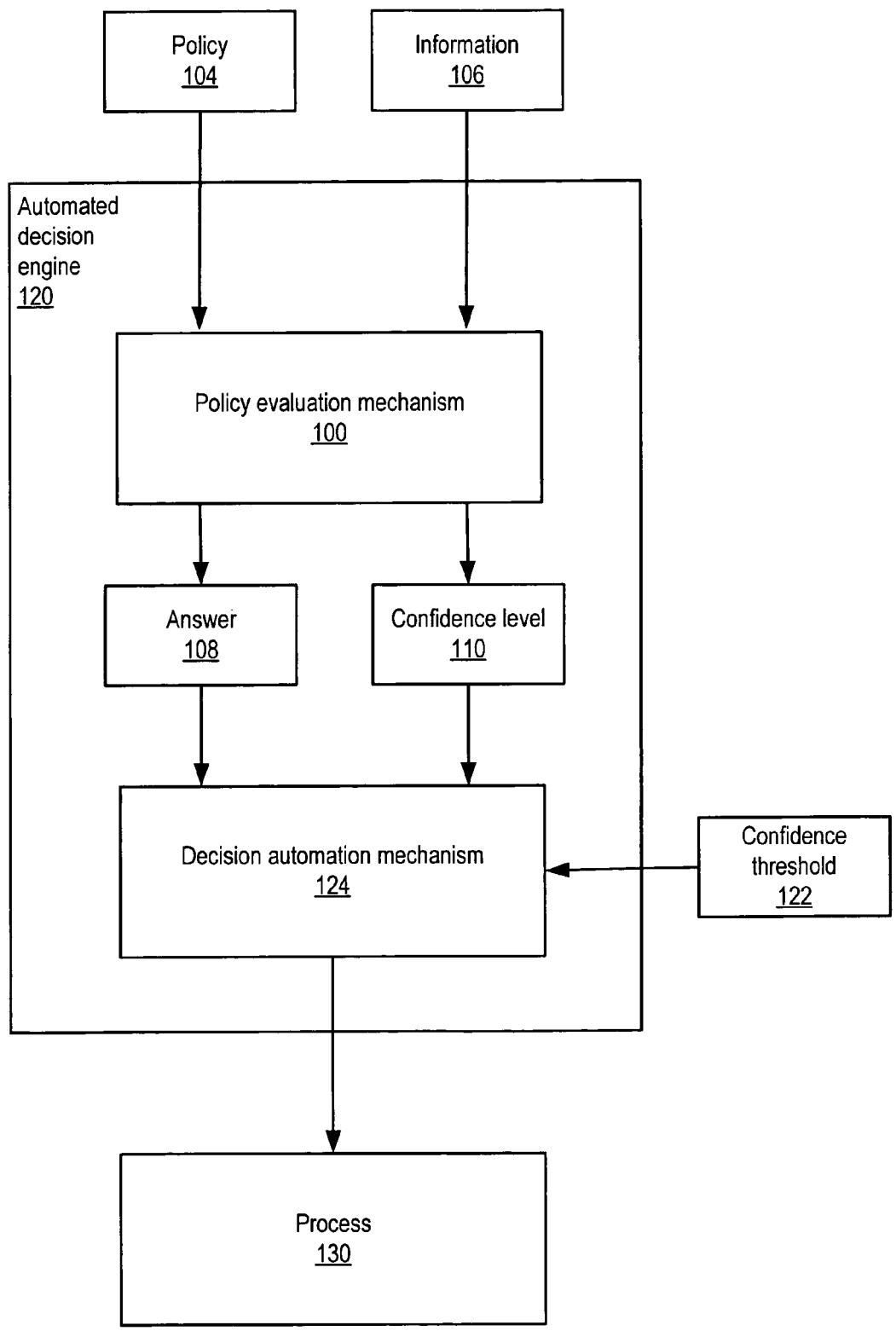
FIG. 2 illustrates an automated decision engine with a policy evaluation mechanism providing an answer and a confidence level in the answer to a decision automation mechanism according to one embodiment.
Figure 3:
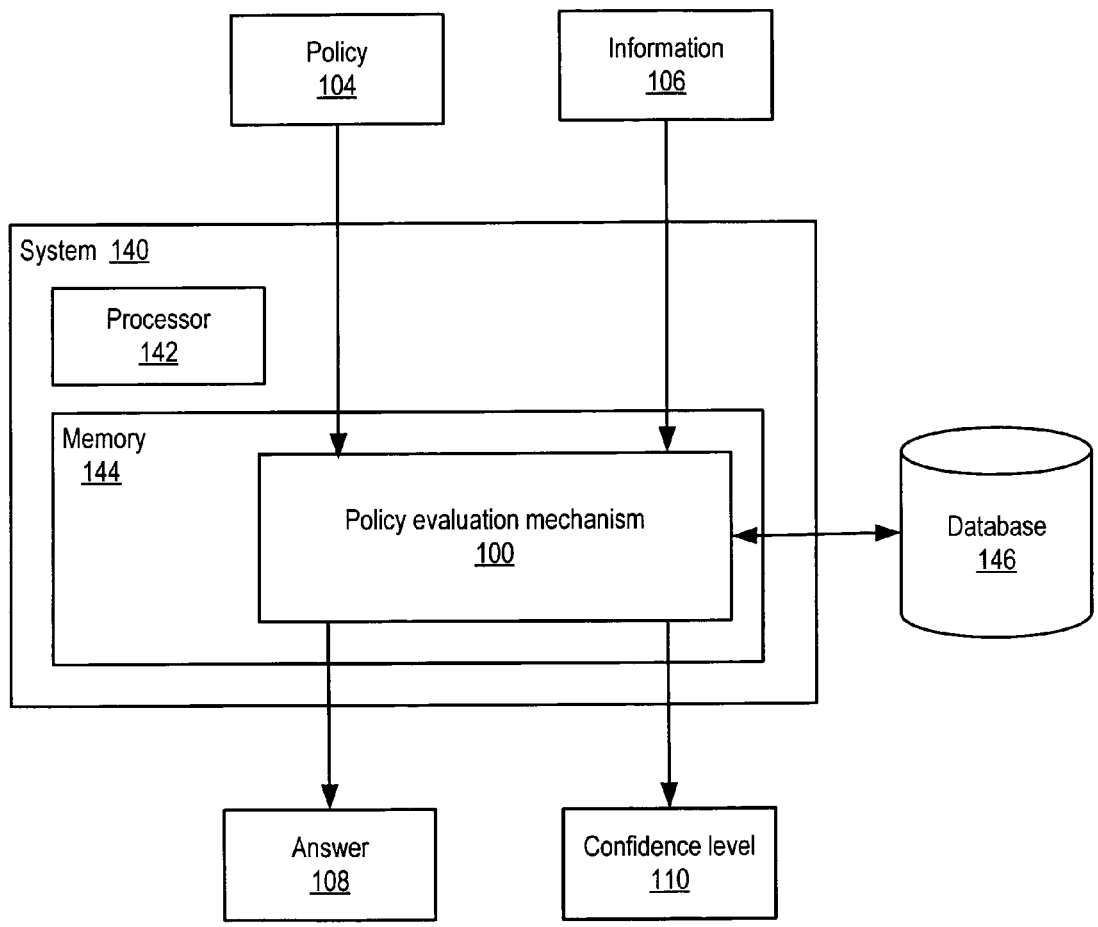
FIG. 3 illustrates a system implementing a policy evaluation mechanism according to one embodiment.
Figure 5:
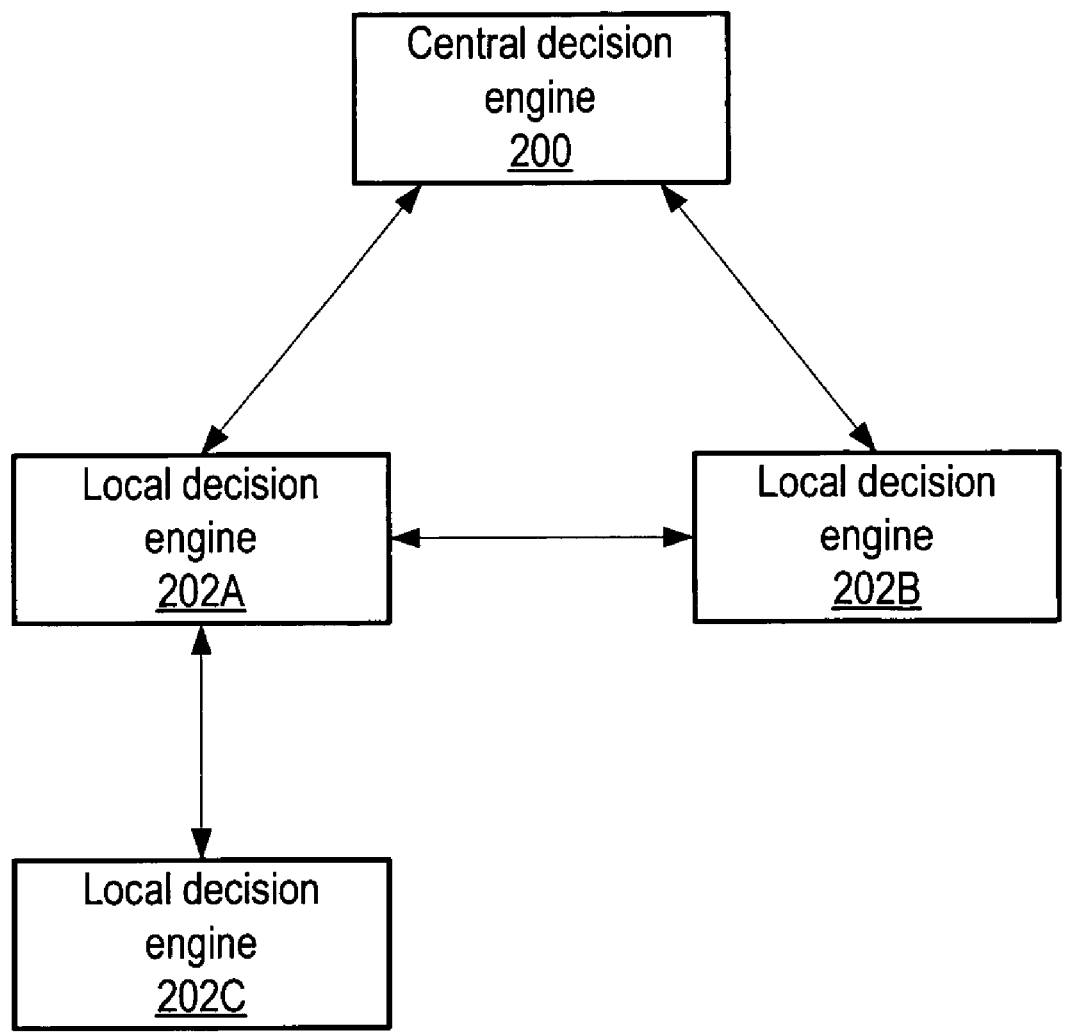
FIG. 5 illustrates a hierarchy of decision engines that may implement a policy evaluation mechanism according to one embodiment.
Figure 6:
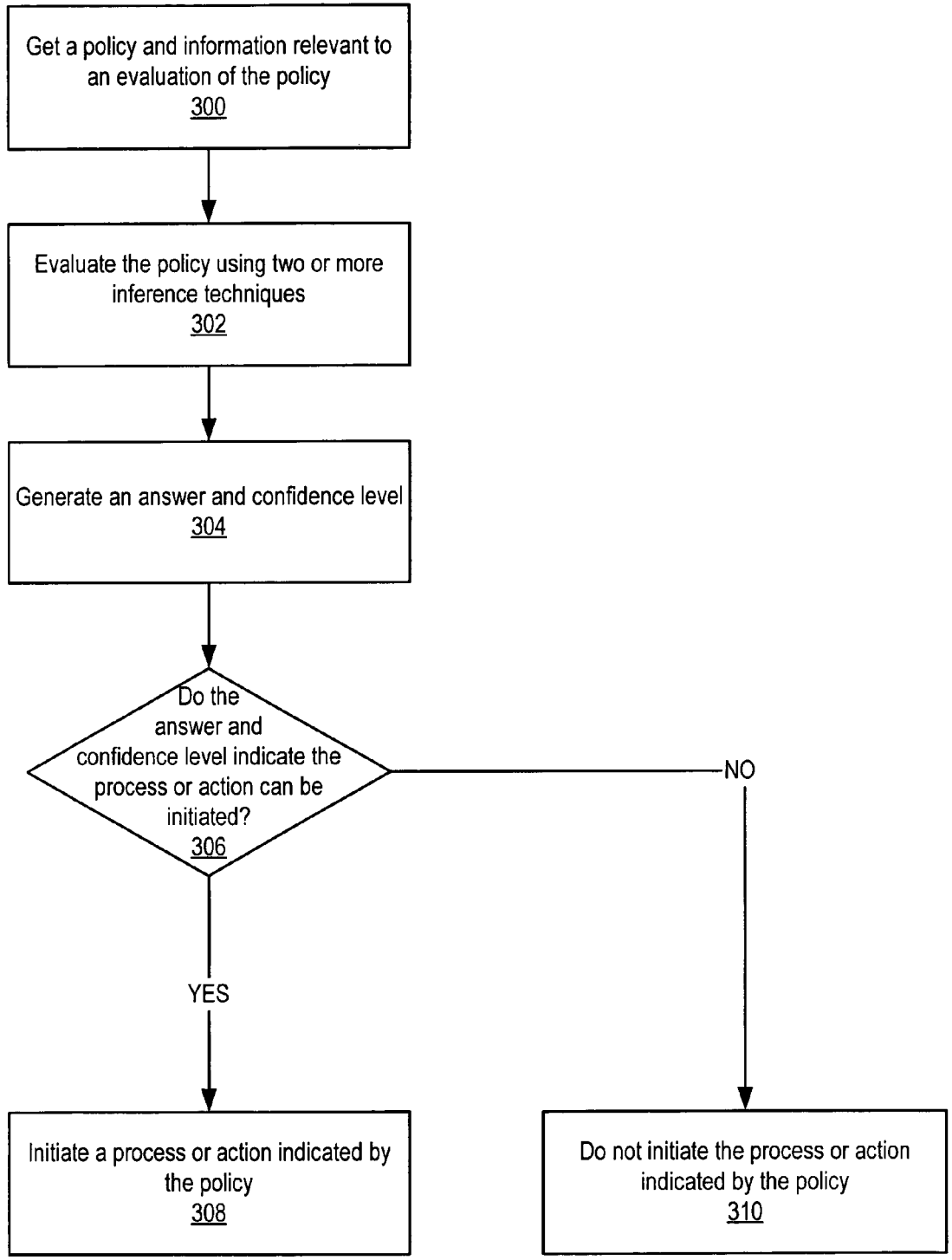
FIG. 6 illustrates a method for evaluating policies using two or more inference techniques according to one embodiment.
Figure 7:
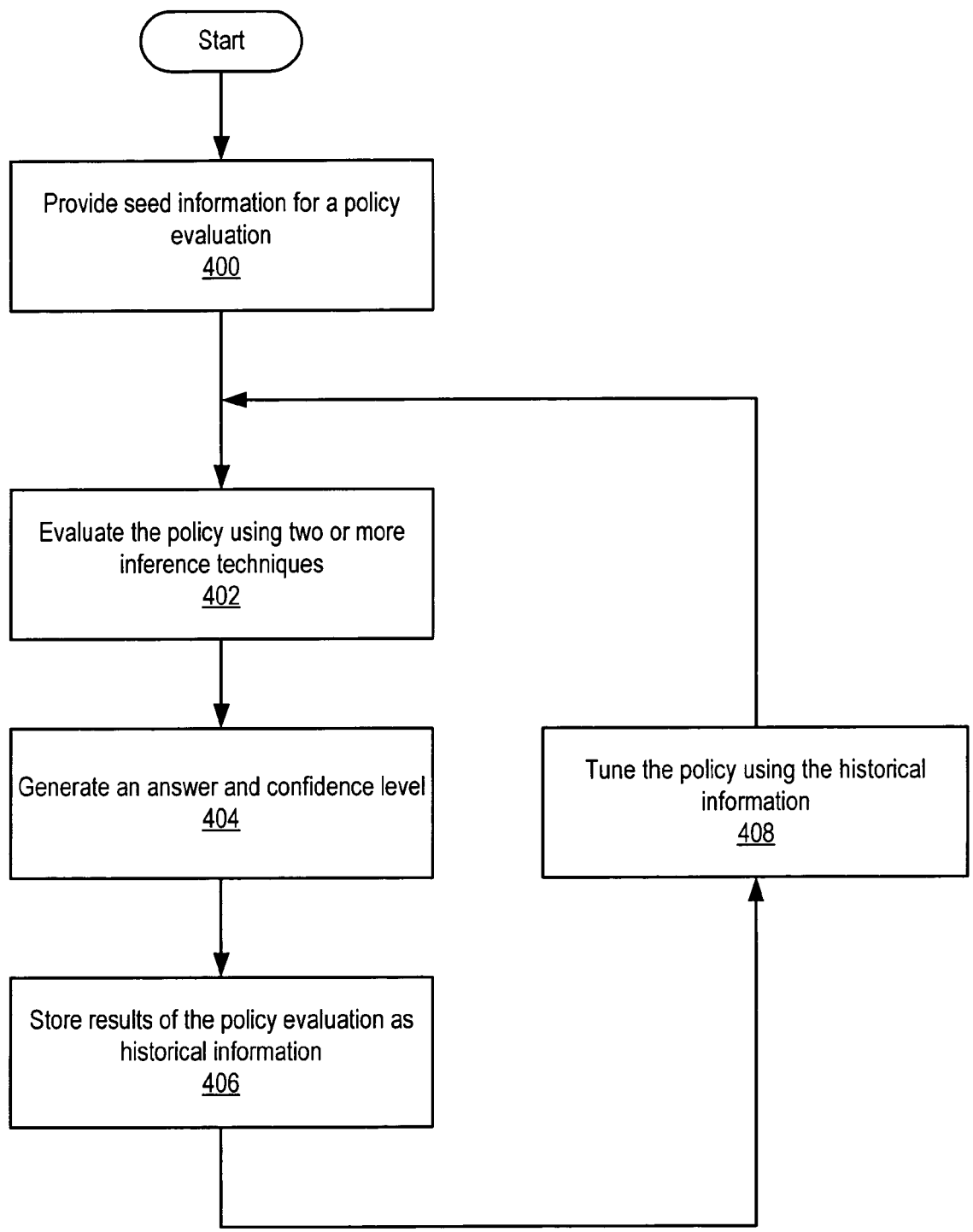
FIG. 7 illustrates a method for the self-tuning of policies evaluated using two or more inference techniques according to one embodiment.

FIGS. 1-7 illustrate means for evaluating policies using two or more inference techniques to generate an answer and a confidence level for the policy evaluations, and means for providing automated computer system administration in an information technology (IT) environment according to the policy evaluations. FIGS. 3 and 7 also illustrate means for storing the results of the policy evaluations as historical information about the policy and means for applying the historical information in subsequent evaluations of the policy to generate results that are more accurate.

FIG. 1 illustrates a policy evaluation mechanism implementing two or more inference techniques to evaluate policies for a system according to one embodiment. Policy evaluation mechanism 100 may include two or more inference techniques 102. Inference techniques 102 may include one or more of, but are not limited to, probability calculus, fuzzy logic and evidential logic inference techniques. Note that policy evaluation mechanism 100 may also use standard Boolean algebra or logic in addition to inference techniques 102 in making policy evaluations.

Policies 104 and information 106 relevant to evaluations of the policies may be input to or accessed by policy evaluation mechanism 100 for evaluation of the policies 104 using two or more of inference techniques 102 to generate answers 108 for the policies 104, and confidence levels 110 indicating the level of confidence in the answers. Policies 104 may include, but are not limited to, policies for computer system administration in an information technology (IT) environment, and policies for administration of subsystems of a computer system such as a backup mechanism or a storage management environment, for example a storage area network (SAN) environment. Information 106 may include, but is not limited to, information input into the system by a system administrator or other user (hereinafter simply referred to as "administrator"), information collected from one or more components of the system or subsystem for which the policy evaluation mechanism 100 is evaluating policies 104, and stored information from previous policy evaluations by policy evaluation mechanism 100.

Policy evaluation mechanism 100 may evaluate a policy 104 in accordance with information 106 relevant to the policy evaluation using two or more of inference techniques 102, and possibly Boolean algebra where needed, to generate an answer 108 for the particular evaluation of the policy 104 and a confidence level 110 in the answer 108. In one embodiment, the answer 108 and confidence level 110 may be provided to the administrator, and may be used by the administrator to determine if an action or actions (hereinafter simply referred to as "action") associated with the policy 104 is to be initiated.

In one embodiment, the answer 108 and confidence level 110 may be used to make an automated decision on whether to automatically initiate an action associated with the policy 104 without human intervention, and to then automatically initiate the action if warranted by the answer 108 and confidence level 110. In this embodiment, if the action is automatically initiated, the answer 108 and confidence level 110 may be provided to the administrator, if desired, for informational purposes or so that the administrator may gain confidence in the policy evaluation mechanism 100 automatically initiating actions without human intervention. The answer 108 and confidence level 110 may be provided to the administrator, for example, in a notification that the action was automatically initiated.

If the action is not automatically initiated because the answer 108 and/or confidence level 110 produced by the policy evaluation do not warrant automatic execution of the action, then the answer 108 and confidence level 110 may be provided to the administrator, for example along with notification that the action was not initiated. The administrator may then choose to override the policy evaluation mechanism's decision to not initiate the action by manually initiating the action or by directing the mechanism to initiate the action, if desired, or alternatively may try to correct a condition that prevented the policy evaluation mechanism 100 from automatically initiating the action and then direct the policy evaluation mechanism 100 to re-evaluate the policy and automatically initiate the action if warranted.

As noted above, policy evaluation mechanism 100 may evaluate a policy 104 according to the information 106 relevant to that policy using two or more inference techniques 102 to generate an answer 108 and a confidence level 110 for the policy evaluation. Embodiments may use multiple inference techniques 102 to overcome the individual limitations of the techniques when resolving uncertainty in the evaluation of policies 104 for policy-based decision systems including policy-based automation systems. Inference techniques 102 may include one or more of probability calculus, fuzzy logic and evidential logic inference techniques. Boolean algebra may also be used in the evaluation of at least some policies. Note, however, that some policies 104 may be evaluated by policy evaluation mechanism 100 using only one of the various inference techniques 102, possibly also using Boolean algebra, if evaluations of those policies 104 are possible using only one inference technique 102. Thus, embodiments are not limited to evaluation of policies using two or more inference techniques.

The following is a general description of probability calculus, fuzzy logic and evidential logic inference techniques that may be used in embodiments of policy evaluation mechanism 100. In some embodiments, these inference techniques may be implemented using the FRIL or FRIL++ programming language.

Inference through probability calculus may be used in embodiments to provide the confidence estimate in the form of lower and upper bounds of the probability of the result being truly known, for example in the range 0 to 1, where 1 indicates certainty. Probability calculus may be used to give the probability of how likely a rule or axiom is. A confidence level is applied to every rule or axiom. When rules are evaluated, the probability values may be combined using probability calculus to generate the confidence level of the "yes/no" answer.

Probability calculus mechanisms are applicable if there is statistical information available, e.g. the failure rates of devices. Statistical information is another kind of information that may be used to seed initial configuration of rules and confidence level calculations.

In embodiments, fuzzy set theory extensions and inference through defuzzification may allow for a human-computer interface that understands "fuzzy" concepts, such as "fast" and "slow", rather than quantitatively exact terms, like such as 10 megabytes per second. For example, is 10 megabytes per second fast or slow? The answer depends on the context. Fuzzy sets may be used in embodiments to make it easier to express policies in simpler, more human terms without unnecessary detail. This may be useful, for example, in defining Service Level Agreements and Service Level Objectives, as required for higher-level cost-benefit oriented policies.

In embodiments, fuzzy set theory may also provide an alternative mechanism for defining uncertainty in terms of possibility rather than probability using fuzzy set membership functions. Fuzzy sets define a model of possibility rather than known probability, and may be useful, for example, when treating a system as a "black box", without understanding the details inside the box. This is powerful because it allows a very simple approximate model to be used to represent a very complex detailed environment, without worrying about the (mostly) irrelevant variables in that environment. This can reduce compute time dramatically, compared to straight probability approaches.

In fuzzy set theory, and using mathematical terms, membership functions may be used to describe the curve of a range of values, for example between 0 and 1 where 1 indicates certainty, for which objects may be members of a set through a domain of values for the objects. Membership functions may either be "real", as in some mathematical function that has been calculated, or may be an approximation, e.g. an approximation based on measurement or experience. In fuzzy set theory, the curve does not have to be "exactly" correct, but approximately or reasonably correct (fuzzy). For functions that are complicated and computationally intensive, an approximate function may be used to determine what is "reasonably correct". "Defuzzification" may be used to generate a confidence level for something being true. A rule based on fuzzy membership does not require the level of prior knowledge of probabilities that, for example, probability calculus does. Using fuzzy set theory, evaluation of a policy or rule may start with something that is roughly or approximately right, for example as a "best guess", and go from there.

Case-based or evidential logic reasoning techniques, referred to as evidential logic inference techniques, may be used in embodiments to allow for policy definitions that improve the confidence calculations by combining the original probability measures or fuzzy membership functions that seeded the knowledge with analysis of previous behavior. Consequently, future policy evaluations may be "tuned" using historical knowledge, and predictions (answers 108 and confidence levels 110) may become more accurate assuming a pattern can be found in the historical information.

Using evidential logic inference techniques, historical information may be collected that allows the weighting of answers or intermediate answers for a decision, for example with a weighting value between 0 and 1, where 1 indicates certainty. The policy evaluation mechanism may be given a problem and an answer to the problem in a particular situation for, or state of, a system, and then the possible states that the system may exhibit may be iterated and the policy evaluation mechanism informed of the answers that are expected for each state. The policy evaluation mechanism is given enough discrete information so that a linear interpolation between two or more cases can give an approximately right answer. If there is historical information available, an evidential logic rule may be used to tune or improve the decisions or confidence levels of the other inference techniques. An evidential logic inference technique uses information that has been collected about the system being monitored. Every system or network environment may be different or unique in one or more ways. An evidential logic inference technique that has collected data (historical information) over time may tune the policy evaluation mechanism to the particular system or network environment.

Using inference techniques including one or more of, but not limited to, probability calculus, fuzzy logic, and evidential logic inference techniques, embodiments may calculate results from two or more of the inference techniques and determine an answer and a range of confidence from the output of the two or more techniques, possibly doing some weighting. The two or more inference techniques may be combined to generate an answer with a confidence level. Each inference technique generates an answer and confidence level "pair". In one embodiment, probability calculus may be used to combine the "pairs" into one answer with an associated confidence in the answer represented by a probability interval, for example between 0 and 1, where 1 implies certainty, which express the minimum and maximum levels of confidence.

Policy rules may include two or more of the inference techniques. Some particular problems in a policy evaluation may be addressable by one technique but not another. Some parts of a policy may be evaluated by one or more inference techniques and the results of those evaluations may then be fed into another part of the policy that is evaluated by other inference techniques or the same inference techniques. Any or all of the techniques may be combined, and may be used in parallel and/or serially in evaluation of a policy.

Embodiments of the policy evaluation mechanism 100 may thus use two or more inference techniques to generate a "yes or no" answer with a confidence level. In one embodiment, the administrator may make a decision on whether to initiate a process or action based on the answer and confidence level. In one embodiment, the policy evaluation mechanism may be a component of a policy automation mechanism or automated decision engine, as described below, and the decision engine may determine whether to automatically initiate a process or action based on the answer and confidence level.

In one embodiment, the answer 108 and confidence level 110 generated by the evaluation of a policy 104 may be stored, for example in a database or knowledge base, and may be used, for example, as input information 106 for subsequent evaluations of the policy 104 to "tune" the policy evaluation mechanism 100's evaluation of the policy 104. In one embodiment, policy evaluation mechanism 100 may evaluate policies using one or more inference techniques, collect iterations of decisions as historical information from the one or more inference techniques, and use an evidential logic inference technique to tune the policy using the historical information. A database may be maintained that includes current and historical information. Whenever a decision is made by the policy evaluation mechanism 100, the database is updated with the input parameters and the resolved decision (answer and confidence level). The next time the policy is evaluated, the evidential logic inference technique may use the stored historical information as a weight towards a particular decision. If the policy evaluation mechanism 100 is being interactively monitored by an administrator, administrator agreement or disagreement with the results of a policy evaluation may also be recorded as historical information and used to tune the policy. For example, if the administrator agrees with the policy evaluation results, that agreement may be recorded so that the next time the policy is evaluated, the confidence level in that answer may be higher.

When a policy is first evaluated, other techniques may be used to populate or "seed" the policy evaluation for use as a starting point. For the initial policy evaluation, the policy evaluation mechanism 100 may be seeded with, for example, "best guesses" of the administrator using basic logic (yes/no), probability functions, statistics and/or fuzzy membership functions. There also may be gaps in knowledge where administrator input is required to make decisions and to build up sufficient information for correct policy evaluation. As the policy is evaluated over time by the policy evaluation mechanism, historical information is stored and used by an evidential logic inference technique to tune the policy to generate answers and confidence levels in the answers that are more accurate.

Thus, some embodiments of policy evaluation mechanism 100 may be self-tuning to improve policy evaluations over time using the stored results of policy evaluations. In addition, other information, for example administrator input, may be used to tune performance of policy evaluation mechanism 100 in some embodiments.

FIG. 2 illustrates an automated decision engine with a policy evaluation mechanism providing an answer and a confidence level in the answer to a decision automation mechanism according to one embodiment. An automated decision engine 120 may include a policy evaluation mechanism 100 and a decision automation mechanism 124. Policy evaluation mechanism 100 may include two or more inference techniques (not shown), which may include one or more of, but are not limited to, probability calculus, fuzzy logic and evidential logic inference techniques. Note that policy evaluation mechanism 100 may also use standard Boolean algebra in addition to inference techniques in making policy evaluations.

Policies 104 and information 106 relevant to evaluations of the policies may be input to or accessed by decision engine 120 for evaluation of the policies 104 by policy evaluation mechanism 100. Policy evaluation mechanism 100 may evaluate a policy 104 in accordance with information 106 relevant to the policy evaluation using two or more inference techniques, and possibly Boolean algebra where needed, to generate an answer 108 for the particular evaluation of the policy 104 and a confidence level 110 in the answer 108. Note that policy evaluation mechanism 100 may evaluate some policies using only one of the inference techniques, and Boolean algebra if necessary, or even using only Boolean algebra; embodiments are not limited to evaluation of policies using multiple inference techniques.

The answer 108 and confidence level 110 may be provided to the decision automation mechanism 124. Decision automation mechanism 124 may then make an automated decision on whether to automatically initiate an action (process 130) associated with the policy 104 without human intervention, and to then automatically initiate the action if warranted by the answer 108 and confidence level 110. In one embodiment, a confidence threshold 122 may be provided to decision automation mechanism 124 and used in determining if the action is to be automatically initiated. For example, the decision automation mechanism 124 may determine to automatically initiate the action if answer 108 is "yes" and the confidence level 110 is equal to or greater than the confidence threshold 122. The decision automation mechanism 124 may determine to not automatically initiate the action if answer 108 is "no" or if answer 108 is "yes" and the confidence level 110 is less than the confidence threshold 122.

In this embodiment, if the action is automatically initiated, the answer 108 and confidence level 110 may be provided to the administrator, if desired, for informational purposes or so that the administrator may gain confidence in the decision engine 120 automatically initiating actions without human intervention. The answer 108 and confidence level 110 may be provided to the administrator, for example, in a notification that the action was automatically initiated. If the action is not automatically initiated because the answer 108 and/or confidence level 110 generated by the policy evaluation mechanism 100 do not warrant automatic execution of the action, then the answer 108 and confidence level 110 may be provided to the administrator, for example along with notification that the action was not initiated. The administrator may then choose to override the policy evaluation mechanism's decision to not initiate the action by manually initiating the action or by directing the mechanism to initiate the action, if desired, or alternatively may try to correct a condition that prevented the decision engine 120 from automatically initiating the action and then direct the decision engine 120 to re-evaluate the policy and automatically initiate the action if warranted.

In one embodiment, to show the administrator that the policy evaluation mechanism 100 and decision engine 120 are trustworthy, the decision engine 120 may inform the administrator what the policy evaluation mechanism 100 is doing and to provide input to improve the decision engine 120's performance, if desired. The administrator may watch to see if the decision engine 120 is doing what it is supposed to be doing and that the answers provided by the policy evaluation mechanism 100 are generally accurate. As the policy evaluation process is repeated, the administrator's confidence in the decision engine 120 will grow if the answers are accurate, and as confidence grows, the administrator will have to do less monitoring to see if the decisions are accurate. Over time, given a chance to learn that the system is generating good answers and thus initiating processes or actions only when warranted, the administrator may choose to just let the decision engine 120 run with little or no monitoring.

This gives the administrator the opportunity to understand what the decision engine 120 decides should be done based on policy evaluations and to decide when to let things happen automatically. Over time, trust may grow in the decision engine 120 if it consistently chooses the right answer and if it notifies the administrator when it does not know the right answer (has a low confidence.) The decision engine 120 "knows" when it is uncertain about its decision, and in one embodiment informs the administrator in these circumstances, only. In one embodiment, if the system has low confidence in an answer, the administrator may provide input to improve future policy evaluations, for example that the answer is right though low confidence in the answer was determined, or that the answer is indeed wrong. Note that, for different policies, an administrator may specify different threshold levels for confidence, e.g. 80% or 90%, at which automatic initiation of a process or action may be performed if the answer is at or above the confidence level.

In one embodiment, the answers 108 and confidence levels 110 generated by policy evaluation mechanism 100 may be stored, for example in a database, and may be used, for example, as input information 106 for subsequent evaluations of policies 104 to "tune" the decision engine 120's evaluation of policies 104. Thus, some embodiments of decision engine 120 may be self-tuning to improve policy evaluations over time using the stored results of prior policy evaluations. In addition, other information, for example administrator input, may be used to tune performance of decision engine 120 in some embodiments.

FIG. 3 illustrates a system implementing a policy evaluation mechanism according to one embodiment. System 140 may be any of various types of devices, including, but not limited to, a personal computer system, desktop computer, laptop or notebook computer, mainframe computer system, workstation, network computer, or other suitable device. System 140 may include at least one processor 142. The processor 142 may be coupled to a memory 144. Memory 144 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

System 140 may include, in memory 144, a policy evaluation mechanism 100. Policy evaluation mechanism 100 may include two or more inference techniques 102. Inference techniques 102 may include one or more of, but are not limited to, probability calculus, fuzzy logic and evidential logic inference techniques. Note that policy evaluation mechanism 100 may also use standard Boolean algebra in addition to inference techniques 102 in making policy evaluations.

Policies 104 and information 106 relevant to evaluations of the policies may be input to or accessed by policy evaluation mechanism 100. Policy evaluation mechanism 100 may evaluate a policy 104 in accordance with information 106 relevant to the policy evaluation using two or more of inference techniques 102, and possibly Boolean algebra where needed, to generate an answer 108 for the particular evaluation of the policy 104 and a confidence level 110 in the answer 108. In one embodiment, the answer 108 and confidence level 110 generated by the evaluation of a policy 104 may be stored, for example in a database 146, and may be used, for example, as input information 106 for subsequent evaluations of the policy 104 to "tune" the policy evaluation mechanism 100's evaluation of the policy 104.

In one embodiment, the answer 108 and confidence level 110 may be provided to the administrator, and may be used by the administrator to determine if an action associated with the policy 104 is to be initiated.

In one embodiment, policy evaluation mechanism may be a component of an automated decision engine such as decision engine 120 of FIG. 2, and the answer 108 and confidence level 110 may be used to make an automated decision on whether to automatically initiate an action associated with the policy 104 without human intervention, and to then automatically initiate the action if warranted by the answer 108 and confidence level 110. In this embodiment, if the action is automatically initiated, the answer 108 and confidence level 110 may be provided to the administrator, if desired, for example in a notification to the administrator that the action was initiated. If the action is not automatically initiated because the answer 108 and/or confidence level 110 produced by the policy evaluation do not warrant automatic execution of the action, then the answer 108 and confidence level 110 may be provided to the administrator, for example along with notification that the action was not initiated.

Figure 4:
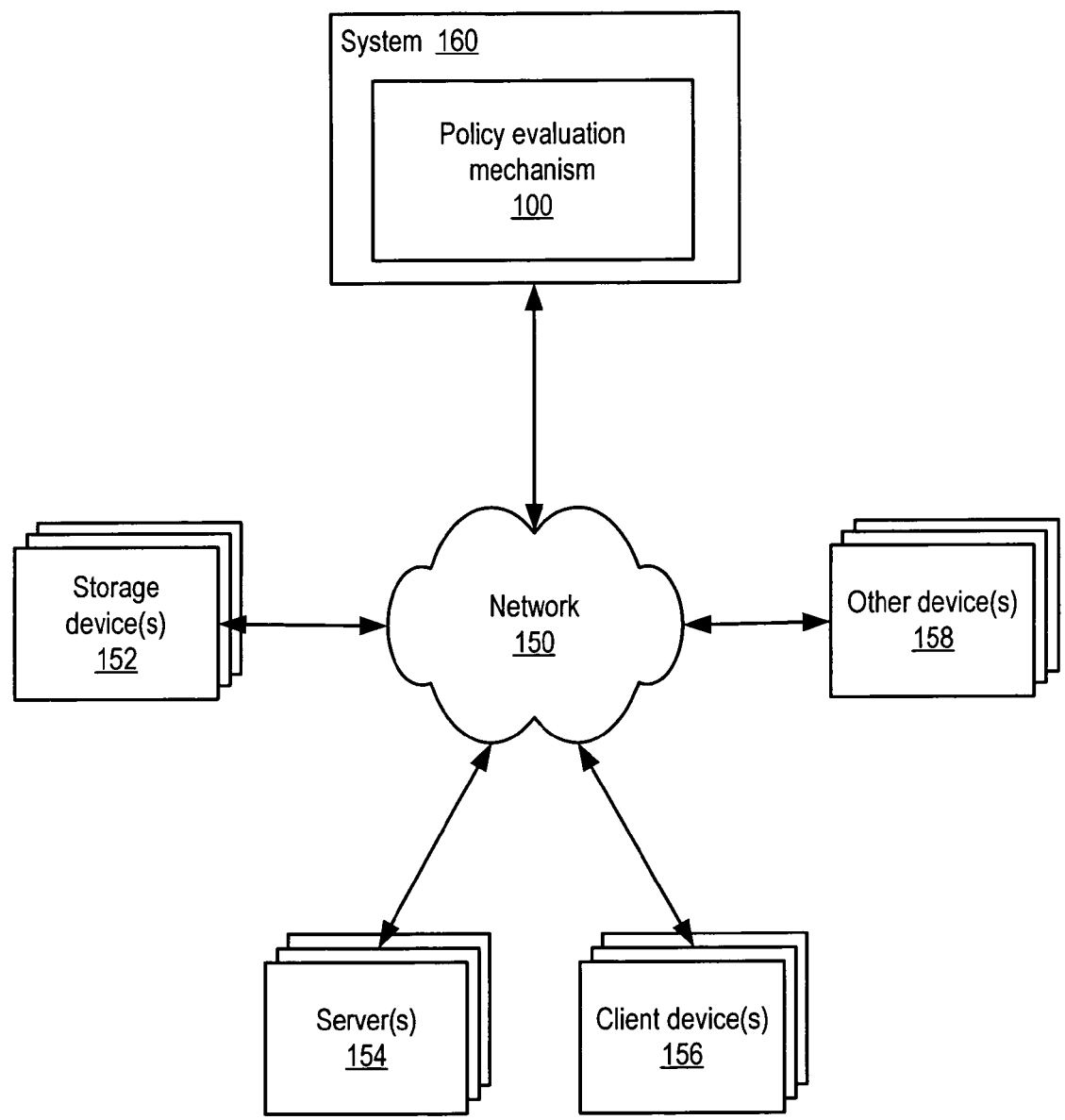
FIG. 4 illustrates a system implementing a policy evaluation mechanism in a network environment according to one embodiment.

FIG. 4 illustrates a system implementing a policy evaluation mechanism in a network environment according to one embodiment. System 160 may couple over a network 150, via wired or wireless network connections, to one or more storage devices 152, one or more servers 154, one or more client devices 156, and/or one or more other devices 158. Network 150 may be, for example, a Local Area Network (LAN), a Wide Area Network (WAN), a Storage Area Network (SAN), a LAN with Network-Attached Storage (NAS), or any network capable of coupling devices to a system 160. The storage devices may include any of one or more types of storage devices including, but not limited to, stand-alone storage devices ("disks"), storage systems such as RAID (Redundant Array of Independent Disks) systems, disk arrays, and JBODs (Just a Bunch Of Disks, used to refer to disk cabinets that do not have a built-in RAID controller), or removable media devices such as tape drives, optical storage devices and removable disks. Servers 154 and clients 156 may be any of various types of devices including, but not limited to, personal computer systems, desktop computers, laptop or notebook computers, mainframe computer systems, workstations, network computers, smartphones, portable digital assistants (PDAs) or other suitable devices. Other devices 158 may include printers, network infrastructure devices such as switches, routers, hubs, and bridges, or in general any device that can be coupled to a network.

System 160, coupled to network 150, may include a policy evaluation mechanism 100 implementing two or more inference techniques for evaluating policies of the network environment or components of the network environment. Two or more of the inference techniques may be used in parallel and/or serially to evaluate individual policies. The inference techniques may include one or more of, but are not limited to, probability calculus, fuzzy logic and evidential logic inference techniques. Note that policy evaluation mechanism 100 may also use standard Boolean algebra in addition to inference techniques in making policy evaluations.

Policies and information relevant to evaluations of the policies may be input to or accessed by policy evaluation mechanism 100. Policies may be specified by an administrator of the network environment. Information relevant to evaluation of a policy may include one or more of, but is not limited to, information input to the system by the administrator, information collected from components of the network environment or devices connected to the network 150, and stored information relevant to policy evaluation. Stored information may include, but is not limited to, results of previous policy evaluations, which may be used to tune subsequent policy evaluations to generate more accurate answers and confidence levels.

Policy evaluation mechanism 100 may evaluate a policy for the network environment in accordance with information relevant to the policy evaluation using two or more inference techniques, and possibly Boolean algebra where needed, to generate an answer for the particular evaluation of the policy and a confidence level in the answer. In one embodiment, the answer and confidence level generated by the evaluation of a policy may be stored, for example in a database, and may be used, for example, as input information for subsequent evaluations of the policy to "tune" the policy evaluation mechanism 100's evaluation of the policy.

In one embodiment, the answer and confidence level generated in a policy evaluation may be provided to the administrator, and may be used by the administrator to determine if an action in the network environment associated with the policy is to be initiated. In one embodiment, policy evaluation mechanism 100 may be a component of an automated decision engine such as decision engine 120 of FIG. 2, and the answer and confidence level may be used to make an automated decision on whether to automatically initiate an action in the network environment associated with the policy without human intervention, and to then automatically initiate the action if warranted by the answer and confidence level. In this embodiment, if the action is automatically initiated, the answer and confidence level may be provided to the administrator, if desired, for example in a notification to the administrator that the action was initiated. If the action is not automatically initiated because the answer and/or confidence level produced by the policy evaluation do not warrant automatic execution of the action, then the answer and confidence level may be provided to the administrator, for example along with notification that the action was not initiated.

Embodiment of the policy evaluation mechanism may be used in systems or network environments to implement a hierarchy of policies, with coarse-grained, fuzzy policies at the top that define a broad spectrum of possible solutions so long as the high-level policy is held in compliance. Farther down in the hierarchy are policies that are more fine-grained, more focused and less fuzzy. As an example of application of an embodiment of the policy evaluation mechanism to implement a hierarchy of policies, from coarse-grained, fuzzy policies at the top to finer-grained, less fuzzy policies at the bottom, in a system or network environment, a vendor and a user (e.g. a corporation, business, etc.) may agree on a service level agreement (SLA) or contract in which the vendor promises to deliver a certain amount of a resource X or a certain level of performance for the system or network environment for a certain amount of money. The SLA may be expressed as a high-level policy or rule which must be met or otherwise the vendor will not be in compliance with the SLA. Below the SLA, there may be lower-level policies that describe and control how frequently to run backups, what level of clustering is to be used, how much online disk storage vs. offline storage, etc. Farther down, there are more details, for example hardware and software such as backup and storage devices and applications, etc, that do the real work. There may be more specific policies for describing and controlling operations at this level.

In one embodiment, there may be two or more policy evaluation mechanisms in a network environment, or on a system, which may be used, for example, to evaluate policies specific to particular components of the network environment or system using two or more inference techniques. In one embodiment, the policy evaluation mechanisms may be components of automated decision engines that may be used to evaluate policies specific to particular components of the network environment or system using two or more inference techniques and to automatically initiate actions or processes in the network environment if the results of the policy evaluations (the answers and confidence levels) indicate that the actions or processes can be automatically initiated.

In one embodiment, there may be a hierarchy of decision engines implementing policy evaluation mechanisms in a network environment or system, with one decision engine serving as a central decision engine. FIG. 5 illustrates a hierarchy of decision engines that may implement a policy evaluation mechanism as described herein according to one embodiment. The central decision engine 200 may be responsible for evaluation of system- or network-wide policies, which may be referred to as "broad" policies. Other "local" decision engines in the hierarchy may be responsible for evaluation of policies specific or local to particular components or devices of the system or network environment. The local decision engines 202 may provide information to the central decision engine 200 for use in evaluation of the broad policies. Central decision engine 200 may provide information to the local decision engines 202 for evaluation of the local policies. In addition, a local decision engine 202, e.g. decision engine 202A, may provide information to other local decisions engines, e.g. decision engine 202B, for use in evaluation of local policies.

Actions automated by the central decision engine 200 in response to broad policy evaluations may include, but are not limited to, initiation of local policy evaluations by the local decision engines 202. Results of these local policy evaluations may be fed back to the central decision engine 200 for use in continued evaluation of the current broad policy that initiated the local policy evaluations and/or for use in future broad policy evaluations.

Local decision engines 202 (e.g. decision engine 202A) may have one or more other local decision engines 202 (e.g. decision engine 202B) below them in the hierarchy, and the interaction between the decision engines (e.g., decision engines 202A and 202B) may be similar to that of the central decision engine 200 and local decision engines 202. For example, local decision engine 202A may be viewed as a "central" decision engine for a particular component of a network environment or system, for example a storage system of a network environment, which is "below" a central decision engine 200 for the entire network environment. Local decision engine 202B may be local to a sub-component of the network environment or system component, for example a backup mechanism for a storage system. Local decision engine 202A may evaluate policies and perform automated actions, if warranted, local to the component of the network environment as directed by central decision engine 200, and in turn local decision engine 202A may direct local decision engine 202B to evaluate policies and perform automated actions, if warranted, local to the sub-component of the component.

FIG. 6 illustrates a method for evaluating policies using two or more inference techniques according to one embodiment. As indicated at 300, a policy and information relevant to evaluating the policy may be obtained. Policies may include, but are not limited to, policies for computer system administration in an information technology (IT) environment, and policies for administration of subsystems of a computer system such as a backup mechanism or a storage management environment, for example a storage area network (SAN) environment. The information may include, but is not limited to, information input by an administrator of the system, information collected from one or more components of the system or subsystem for which the policy evaluation is being performed, and stored information from previous policy evaluations.

As indicated at 302, the policy may be evaluated in accordance with the information relevant to the policy evaluation using two or more of inference techniques, and possibly Boolean algebra where needed. As indicated at 304, the policy evaluation may generate an answer for the particular evaluation of the policy and a confidence level in the answer.

As indicated at 306, the answer and confidence level may be examined to determine if a process or action associated with the policy may be initiated. In one embodiment, 306 may be performed by a human administrator. In this embodiment, the answer and confidence level may be provided to the administrator of the system, and may be used by the administrator to determine if the action or process indicated by the policy is to be initiated. The administrator may then initiate the action or process if desired, as indicated at 308, or not initiate the action or process, as indicated at 310. In one embodiment, 306 may be performed by a decision engine. In this embodiment, the answer and confidence level may be used to make an automated decision on whether to automatically initiate an action or process indicated by the policy without human intervention, and to then automatically initiate the action if warranted by the answer and confidence level, as indicated at 308, or not initiate the action or process if the answer and/or confidence level do not warrant automatic initiation, as indicated at 310

If 306 is performed by a decision engine, the answer and confidence level may be provided to the administrator whether the action or process was or was not automatically initiated, for example in a notification of automatic initiation of the process or action or a notification of failure to automatically initiate the process or action. If the decision engine does not automatically initiate the process or action, as indicated at 310, because the answer and/or confidence level do not warrant automatic initiation, the administrator may then choose to override the decision of the decision engine and manually initiate the process or action, if desired, or alternatively may choose to perform some action or actions to try to rectify problems that may have prevented the decision engine from automatically initiating the action or process and then direct the decision engine to re-evaluate the policy.

FIG. 7 illustrates a method for the self-tuning of policies evaluated using two or more inference techniques according to one embodiment. As indicated at 400, seed information may be provided for an initial evaluation of a policy by a policy evaluation mechanism. This information may include, but is not limited to, information input by an administrator of the system and information collected from one or more components of the system or subsystem for which the policy evaluation is being performed. As indicated at 402, the policy may be evaluated using two or more inference techniques using the seed information. An answer and confidence level may be generated from the initial evaluation of the policy, as indicated at 404. Results of the policy evaluation (e.g., the answer and confidence level) may be stored as historical information, for example in a database, as indicated at 406. This historical information may then be used as input to subsequent evaluations of the policy to tune the policy evaluations to provide answers and confidence levels that are more accurate, as indicated at 408. In turn, results of the subsequent evaluations of the policy may be stored as historical evaluation and used to further tune the policy evaluation.

Policy Evaluation and Policy-Based Automation Using a Decision Support Language

In some embodiments, decision-making in a policy-based automation mechanism may be implemented or augmented by the application of a decision support language to the evaluation of policies. The Fuzzy Relational Inference Language (FRIL) and FRIL++ programming languages (hereinafter collectively referred to as FRIL) are provided as examples of decision support languages that may be used in some embodiments. Using FRIL, the evaluation of complex policy rules may be realized despite incomplete knowledge of the environment. In embodiments, FRIL may be used to support the calculation of a confidence level in the "yes/no" evaluation. This allows users of the policy-based automation mechanism to learn to trust its accuracy.

In one embodiment, policies may be expressed as one or more predicates that may be either axioms (knowledge) or conditions in the decision support language (e.g., FRIL), and evaluation of a policy may be performed by asking the system whether a particular goal is known. As well as first-order predicate logic inference, FRIL supports multiple inference mechanisms using probability theory, fuzzy set theory and evidential logic reasoning theory. These inference mechanisms may work in conjunction with the logic inference to calculate the confidence level of a "yes/no" answer. For example, a "yes" answer may be provided along with a minimum probability of 80% and a maximum probability of 85%.

FRIL provides a mechanism for calculating uncertainty across probability and possibility distributions that is more accurate than other more arbitrary "defuzzification" techniques. This mechanism is the "mass assignment" theory of probability and possibility distributions.

In some embodiments, a self-tuning policy-based automation mechanism may be implemented or augmented by the application of a decision support language to the evaluation of policies. FRIL and FRIL++are provided as examples of decision support languages that may be used in some embodiments.

FRIL supports evidential logic as an inference mechanism and can manipulate its data before evaluating it as another program. In one embodiment, a FRIL-based policy rule may extend itself with evidential logic predicates derived from historical information, and thus may improve the accuracy of the confidence calculation for that policy rule. FRIL supports evidential logic inference as one of the techniques that are built into the language for resolving uncertainty. FRIL supports meta-programming, in that a FRIL program may be manipulated as data and then evaluated at runtime because a FRIL program has the same form as a basic FRIL data structure: the list. For example, a policy rule written as a list of FRIL predicates could extend itself by adding evidential logic predicates that refine the policy rule's confidence calculation by using evidential "weights" calculated from a database of historical information about that policy rule.

Therefore, in embodiments of the policy evaluation mechanism, a FRIL program may write a new FRIL program or extensions to the program, or may even modify itself, and then evaluate policies using the new program. FRIL supports evidential reasoning. If there is a policy defined, information on how well the policy is doing and metrics on how well the system is behaving may be collected over time. That collected information may be used to program an evidential reasoning-based rule inside the FRIL policy. Thus, using FRIL, a policy may be implemented that starts with a good ballpark recommendation (answer and confidence level) using one or more inference techniques such as fuzzy logic, probability calculus, or whatever technique is appropriate. Over time, information may be collected that is used to add new extensions to the policy using evidential logic.

Note that it is not just the evaluations of the original policy that evidential logic is applied to; the evidential logic may be used to modify the policy's definition itself. Rules can be added or modified in a policy. In FRIL, a program includes two types of information: data and rules. FRIL provides a mechanism to evaluate the rules. Rules may be modified or added based on the evaluations. The result is a policy evaluation mechanism that is capable of self-tuning to improve its performance over time; the policy evaluation mechanism corrects itself, and may run without human intervention.

As an example, in a policy-based automation mechanism, or decision engine, that is being used interactively such that the user is prompted with a recommendation before it is executed, the user may repeatedly choose a different answer than the mechanism's recommendation. Using FRIL, the policy-based automation mechanism may use the history of the user's choices to teach itself, by programming an evidential logic rule for the policy, to recommend the user's preferred answer in the future. Consequently, future decisions may be "tuned" using historical knowledge, and predictions may become more accurate, assuming that a pattern can be found in the historical information. In seeing that the policy-based automation mechanism "learns" from prior results, the user may be more inclined to trust the mechanism's recommendations, as they are more likely to see it choose the preferred answer over time.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a processor; and
a memory comprising program instructions, wherein the program instructions are executable by the processor to implement a policy-based automation mechanism configured to evaluate policies to provide automated computer system administration in an information technology (IT) environment, wherein each policy specifies a set of one or more rules and a process to be automatically initiated in the IT environment dependent upon an evaluation of the policy, and wherein, to evaluate policies, the policy-based automation mechanism is configured to:
access a policy and information relevant to an evaluation of the policy;
evaluate the same policy according to the information using two or more different inference techniques to generate a positive or negative answer as to whether a process specified by the policy is to be automatically initiated and a confidence level for the positive or negative answer;
initiate the process specified by the policy in the IT environment if the positive or negative answer and the confidence level indicate that the process is to be initiated; and
not initiate the process specified by the policy in the IT environment if the positive or negative answer and the confidence level indicate that the process is not to be initiated.

2. The system as recited in claim 1, wherein the inference techniques include one or more of probability calculus, fuzzy logic and evidential logic.

3. The system as recited in claim 1, wherein the policy-based automation mechanism is further configured to provide the positive or negative answer and the confidence level for the positive or negative answer to a user of the system.

4. The system as recited in claim 1, wherein, to initiate the process specified by the policy in the IT environment if the positive or negative answer and the confidence level indicate that the process is to be initiated, the policy-based automation mechanism is configured to initiate the process automatically in the IT environment if the positive or negative answer indicates that the process is to be initiated and if the confidence level for the positive or negative answer is higher than a predetermined confidence threshold.

5. The system as recited in claim 1, wherein the policy-based automation mechanism is configured to evaluate policies to provide automated administration for one or more of a storage management mechanism and an application management mechanism.

6. The system as recited in claim 1, wherein the inference techniques are implemented according to an uncertainty logic programming language.

7. The system as recited in claim 6, wherein the uncertainty logic programming language is one of Fuzzy Relational Inference Language (FRIL) and FRIL++.

8. A system, comprising:
means for evaluating policies each specifying a set of one or more rules and a process to be automatically initiated in an information technology (IT) environment if an evaluation of the policy indicates that the specified process is to be automatically initiated, said means using two or more different inference techniques to evaluate the same policy and generate a positive or negative answer as to whether the process specified by the policy is to be automatically initiated and a confidence level for the positive or negative answer; and
means for automatically initiating the process specified by the policy in the IT environment if the positive or negative answer and the confidence level for the positive or negative answer indicate that the process is to be initiated.

9. A method, comprising:
evaluating policies to provide automated computer system administration in an information technology (IT) environment, wherein each policy specifies a set of one or more rules and a process to be automatically initiated in the IT environment if an evaluation of the policy indicates that the process is to be automatically initiated, and wherein said evaluating policies comprises:
accessing a policy and information relevant to an evaluation of the policy; and
evaluating the same policy according to the information using two or more different inference techniques including one or more of probability calculus, fuzzy logic and evidential logic to generate a positive or negative answer as to whether a process specified by the policy is to be automatically initiated and a confidence level for the positive or negative answer;
initiating the process specified by the policy in the IT environment if the positive or negative answer and the confidence level indicate that the process is to be initiated; and
not initiating the process specified by the policy in the IT environment if the positive or negative answer and the confidence level indicate that the process is not to be initiated.

10. The method as recited in claim 9, further comprising providing the positive or negative answer and the confidence level for the positive or negative answer to a user in the IT environment.

11. The method as recited in claim 9, wherein said initiating the process specified by the policy in the IT environment if the positive or negative answer and the confidence level indicate that the process is to be initiated comprises automatically initiating the process in the IT environment if the positive or negative answer indicates that the process is to be initiated and if the confidence level for the positive or negative answer is higher than a predetermined confidence threshold.

12. The method as recited in claim 9, wherein said automated computer system administration in the IT environment comprises automated administration of one or more of a storage management mechanism and an application management mechanism.

13. The method as recited in claim 9, wherein the inference techniques are implemented according to one of Fuzzy Relational Inference Language (FRIL) and FRIL++.

14. A computer-accessible storage medium comprising program instructions, wherein the program instructions are configured to implement:

evaluating policies to provide automated computer system administration in an information technology (IT) environment, wherein each policy specifies a set of one or more rules and a process to be automatically initiated in the IT environment if an evaluation of the policy indicates that the process is to be automatically initiated, and wherein said evaluating policies comprises:

accessing a policy and information relevant to an evaluation of the policy;

evaluating the same policy according to the information using two or more different inference techniques including one or more of probability calculus, fuzzy logic and evidential logic to generate a positive or negative answer as to whether a process specified by the policy is to be automatically initiated and a confidence level for the positive or negative answer; and initiating the process specified by the policy in the IT environment if the positive or negative answer and the confidence level indicate that the process is to be initiated; and not initiating the process specified by the policy in the IT environment if the positive or negative answer and the confidence level indicate that the process is not to be initiated.

15. The computer-accessible medium as recited in claim 14, wherein said automated computer system administration in the IT environment comprises automated administration of one or more of a storage management mechanism and an application management mechanism.

16. A system, comprising:

a processor; and a memory comprising program instructions, wherein the program instructions are executable by the processor to implement a self-tuning policy evaluation mechanism configured to evaluate policies to provide automated computer system administration in an information technology (IT) environment, wherein each policy specifies a set of one or more rules and a process to be automatically initiated in the IT environment if an evaluation of the policy indicates that the process is to be automatically initiated, and wherein the self-tuning policy evaluation mechanism is configured to:

evaluate a policy according to information relevant to an evaluation of the policy using two or more different inference techniques to generate results including a positive or negative answer as to whether a process specified by the policy is to be automatically initiated and a confidence level for the positive or negative answer;

initiate the process specified by the policy in the IT environment if the positive or negative answer and the confidence level indicate that the process is to be initiated;

store the results of the policy evaluation in a database of historical information about the policy; and access the historical information stored in the database in subsequent evaluations of the policy to generate more accurate results.

17. The system as recited in claim 16, wherein the inference techniques includes one or more of probability calculus, fuzzy logic and evidential logic.

18. The system as recited in claim 16, wherein, to initiate the process specified by the policy, the self-tuning policy evaluation mechanism is further configured to automatically initiate the process specified by the policy in the IT environment if the positive or negative answer indicates that the process is to be initiated and if the confidence level for the positive or negative answer is higher than a predetermined confidence threshold.

19. The system as recited in claim 16, wherein the self-tuning policy evaluation mechanism is configured to evaluate policies to provide automated administration for one or more of a storage management mechanism and an application management mechanism.

20. The system as recited in claim 16, wherein the inference techniques are implemented according to one of Fuzzy Relational Inference Language (FRIL) and FRIL++.

21. A system for providing automated computer system administration in an information technology (IT) environment according to policy evaluations, comprising:

means for evaluating policies each specifying a set of one or more rules and a process to be automatically initiated in an information technology (IT) environment if an evaluation of the policy indicates that the specified process is to be automatically initiated, said means using two or more different inference techniques to evaluate the same policy and generate results including a positive or negative answer and a confidence level for the positive or negative answer;

means for initiating the process specified by the policy in the IT environment if the positive or negative answer and the confidence level indicate that the process is to be initiated;

means for storing the results of the policy evaluations as historical information about the policy; and means for applying the historical information about the policy in subsequent evaluations of the policy to generate more accurate results.

22. A method, comprising:

evaluating policies to provide automated computer system administration in an information technology (IT) environment, wherein each policy specifies a set of one or more rules and a process to be automatically initiated in the IT environment if an evaluation of the policy indicates that the process is to be automatically initiated, and wherein said evaluating policies comprises:

evaluating a policy according to information relevant to an evaluation of the policy using two or more different inference techniques including one or more of probability calculus, fuzzy logic and evidential logic to generate results including a positive or negative answer as to whether a process specified by the policy is to be automatically initiated and a confidence level for the positive or negative answer;

initiating the process specified by the policy in the IT environment if the positive or negative answer and the confidence level indicate that the process is to be initiated;

storing the results of the policy evaluation in a database of historical information about the policy; and accessing the historical information stored in the database in subsequent evaluations of the policy to generate more accurate results.

23. The method as recited in claim 22, wherein said initiating the process specified by the policy in the IT environment comprises automatically initiating the process specified by the policy in the IT environment if the positive or negative answer indicates that the process is to be initiated and if the confidence level for the positive or negative answer is higher than a predetermined confidence threshold.

24. The method as recited in claim 22, wherein said automated computer system administration in the IT environment comprises automated administration of one or more of a storage management mechanism and an application management mechanism.

25. The method as recited in claim 22, wherein the inference techniques are implemented according to one of Fuzzy Relational Inference Language (FRIL) and FRIL++.

26. A computer-accessible storage medium comprising program instructions, wherein the program instructions are configured to implement:
evaluating policies to provide automated computer system administration in an information technology (IT) environment, wherein each policy specifies a set of one or more rules and a process to be automatically initiated in the IT environment if an evaluation of the policy indicates that the process is to be automatically initiated, and wherein said evaluating policies comprises:
evaluating a policy according to information relevant to an evaluation of the policy using two or more different inference techniques including one or more of probability calculus, fuzzy logic and evidential logic to generate results including a positive or negative answer as to whether a process specified by the policy is to be automatically initiated and a confidence level for the positive or negative answer;
initiating the process specified by the policy in the IT environment if the positive or negative answer and the confidence level indicate that the process is to be initiated;
storing the results of the policy evaluation in a database of historical information about the policy; and
accessing the historical information stored in the database in subsequent evaluations of the policy to generate more accurate results.

27. The computer-accessible medium as recited in claim 26, wherein, in said initiating the process specified by the policy in the IT environment, the program instructions are configured to further implement automatically initiating the process specified by the policy in the IT environment if the positive or negative answer indicates that the process is to be initiated and if the confidence level for the positive or negative answer is higher than a predetermined confidence threshold.

28. The computer-accessible medium as recited in claim 26, wherein said automated computer system administration in the IT environment comprises automated administration of one or more of a storage management mechanism and an application management mechanism.

29. A system for automated administration of an information technology (IT) environment, comprising:
a plurality of decision engines comprising:
one or more local decision engines each configured to provide automated administration for one component in the IT environment according to one or more local policies for the component, wherein each local policy specifies a set of one or more rules and a process to be automatically initiated in the IT environment if an evaluation of the local policy indicates that the process is to be automatically initiated; and
a central decision engine configured to provide automated administration of the IT environment according to one or more high-level policies for the IT environment, wherein each high-level policy specifies a set of one or more rules and a process to be automatically initiated in the IT environment if an evaluation of the high-level policy indicates that the process is to be automatically initiated;
wherein each of the decision engines is configured to:
evaluate a policy associated with the decision engine according to information relevant to an evaluation of the policies using two or more different inference techniques including probability calculus, fuzzy logic and evidential logic to generate results including a positive or negative answer as to whether a process specified by the policy is to be automatically initiated and a confidence level for the positive or negative answer; and
automatically initiate the process specified by the policy in the IT environment if the positive or negative answer indicates that the process is to be initiated and if the confidence level for the positive or negative answer is higher than a predetermined confidence threshold.

30. The system as recited in claim 29, wherein the components include one or more of a storage management mechanism and an application management mechanism.

31. The system as recited in claim 29, wherein the local decision engines are further configured to provide the results of local policy evaluations to the central decision engine for use in evaluations of the high-level policies for the IT environment.

32. The system as recited in claim 29, wherein, to provide automated administration of the IT environment according to one or more high-level policies for the IT environment, the central decision engine is configured to:
evaluate the high-level policies using two or more different inference techniques to generate results including positive or negative answers as to whether processes specified by the high-level policies is to be automatically initiated and associated confidence levels for the positive or negative answers generated by the high-level policy evaluations; and
delegate local policies to the one or more local decision engines for evaluation.

* * * * *